US012593126B2

(12) United States Patent　　　(10) Patent No.:　US 12,593,126 B2

Oguro　　　　　　　　　　　　　(45) Date of Patent:　Mar. 31, 2026

(54) PHOTOGRAPHING DEVICE AND FOCUS CONTROL METHOD

(71) Applicant: Beijing Xiaomi Mobile Software Co., Ltd., Beijing (CN)

(72) Inventor: Yusuke Oguro, Tokyo (JP)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 18/559,625

(22) PCT Filed: May 20, 2022

(86) PCT No.: PCT/CN2022/094276

§ 371 (c)(1),
(2) Date: Nov. 8, 2023

(87) PCT Pub. No.: WO2023/221141

PCT Pub. Date: Nov. 23, 2023

(65) Prior Publication Data

US 2025/0097574 A1　　Mar. 20, 2025

(51) Int. Cl.
*H04N 23/67* (2023.01)
*H04N 23/55* (2023.01)
*H04N 23/90* (2023.01)

(52) U.S. Cl.
CPC ........... *H04N 23/672* (2023.01); *H04N 23/55* (2023.01); *H04N 23/90* (2023.01)

(58) Field of Classification Search
CPC ...... H04N 23/672; H04N 23/55; H04N 23/90; H04N 23/675; H04N 23/00; H04N 23/45; H04N 23/60; H04N 23/673; G02B 3/14
See application file for complete search history.

(56) References Cited

U.S. PATENT DOCUMENTS

2010/0302433 A1　12/2010　Egawa
2015/0234150 A1*　8/2015　Katsunuma .......... G02B 3/0056
　　　　　　　　　　　　　　　　　　　348/360

(Continued)

FOREIGN PATENT DOCUMENTS

JP　　2021-176009 A　　11/2021
KR　　20190129684 A　　11/2019
KR　　20200034276 A　　3/2020

OTHER PUBLICATIONS

Notice of final examination opinions issued by the Japanese Patent Office on Nov. 11, 2024, in corresponding Application No. JP 2022-538156, 7 pages.

(Continued)

*Primary Examiner* — Christopher K Peterson

(74) *Attorney, Agent, or Firm* — Finnegan, Henderson, Farabow, Garrett & Dunner, L.L.P.

(57)　　　　　ABSTRACT

A photographing device is provided, including a first camera unit having a first optical system; a second camera unit having a second optical system facing a same direction as the first camera unit; and a focus control component performing focus control over the first camera unit and the second camera unit. Each of the first camera unit and the second camera unit includes a photographing element, and the photographing element includes a two-dimensional arrangement of ordinary pixels that output an image signal for generating an image and phase pixels that are surrounded by the ordinary pixels and arranged discretely and output a phase difference signal for detecting a focus. The focus control component performs focus control over the first optical system with reference to second defocus information acquired from the phase difference signal output by the photographing element of the second camera unit, in case (Continued)

(A)

(B)

that the image is generated using the image signal output by the photographing element of the first camera unit.

9 Claims, 9 Drawing Sheets

(56)                    References Cited

U.S. PATENT DOCUMENTS

| | | | |
|---|---|---|---|
| 2016/0065833 A1* | 3/2016 | Chen | H04N 23/45 |
| | | | 348/262 |
| 2019/0191145 A1* | 6/2019 | Chang | H04N 13/243 |
| 2020/0124828 A1 | 4/2020 | Kang et al. | |
| 2021/0263290 A1* | 8/2021 | Vinogradov | G02B 7/021 |

OTHER PUBLICATIONS

Notice of Reasons for Refusal issued by the Japanese Patent Office on Jun. 26, 2024, in corresponding Application No. JP 2022-538156, 4 pages.
Extended European Search Report Issued in Application No. 22941860.3 dated May 20, 2025, 15 pages.
Office Action for Korean Application 10-2023-7037882, dated Sep. 18, 2025.

* cited by examiner

Wide-angle image (image of first camera unit)

Telephone image (image of second camera unit)

Wide-angle image (image
of first camera unit)

PHOTOGRAPHING DEVICE AND FOCUS CONTROL METHOD

CROSS-REFERENCE TO RELATED APPLICATION

The present application is a US national phase application of International Application No. PCT/CN2022/094276, filed on May 20, 2022, the entire content of which is incorporated by reference.

FIELD

The present disclosure relates to a photographing device and a focus control method.

BACKGROUND

A photographing device that performs autofocus control using a phase difference signal acquired on an image plane of a photographing element is known. As an example of a photographing element that outputs such a phase difference signal, the photographing element includes a two-dimensional arrangement of ordinary pixels that output an image signal dedicated to generating an image and phase pixels that output a phase difference signal dedicated to autofocus (e.g., see JP2016090785A). Such a photographing element is advantageous in that it can be manufactured at a lower cost, compared with a photographing element in which all pixels are pupil-divided for their respective micro-lenses and which has two photoelectric conversion components and can switch between the output of the image signal and the output of the phase difference signal.

SUMMARY

A photographing device according to a first aspect of the present disclosure includes: a first camera unit having a first optical system: a second camera unit having a second optical system facing a same direction as the first camera unit; and a focus control component performing focus control over the first camera unit and the second camera unit. Each of the first camera unit and the second camera unit includes a photographing element, and the photographing element includes a two-dimensional arrangement of ordinary pixels that output an image signal for generating an image and phase pixels that are surrounded by the ordinary pixels and arranged discretely and output a phase difference signal for detecting a focus. The focus control component performs focus control over the first optical system with reference to defocus information acquired from the phase difference signal output by the photographing element of the second camera unit, in case that the image is generated using the image signal output by the photographing element of the first camera unit.

A focus control method according to a second aspect of the present disclosure includes: performing focus control over a first camera unit and a second camera unit of a photographing device. The photographing device includes: the first camera unit having a first optical system: and the second camera unit having a second optical system facing a same direction as the first camera unit. Each of the first camera unit and the second camera unit includes a photographing element, and the photographing element includes a two-dimensional arrangement of ordinary pixels that output an image signal for generating an image and phase pixels that are surrounded by the ordinary pixels and arranged discretely and output a phase difference signal for detecting a focus. In case that the image is generated using the image signal output by the photographing element of the first camera unit, the focus control method further includes: acquiring defocus information based on the phase difference signal output by the photographing element of the second camera unit, and driving a focusing lens of the first optical system with reference to the defocus information.

A method for generating a wide-angle image according to a third aspect of the present disclosure includes: acquiring first defocus information by a focus control component; acquiring second defocus information by the focus control component; judging, by the focus control component, whether to perform focus control over an optical system of a photographing element based on the first defocus information; determining, by the focus control component, a focus area of the photographing element based on the second defocus information; moving, by the focus control component, a focusing lens of the optical system based on the first defocus information; judging, by the focus control component, whether the photographing element is in a focus state by making the photographing element output a phase difference signal and evaluating a phase waveform of the phase difference signal; correcting, by the focus control component, a position of the focusing lens to focus on a subject to be photographed; and executing a photographing process.

DETAILED DESCRIPTION

Figure 1:
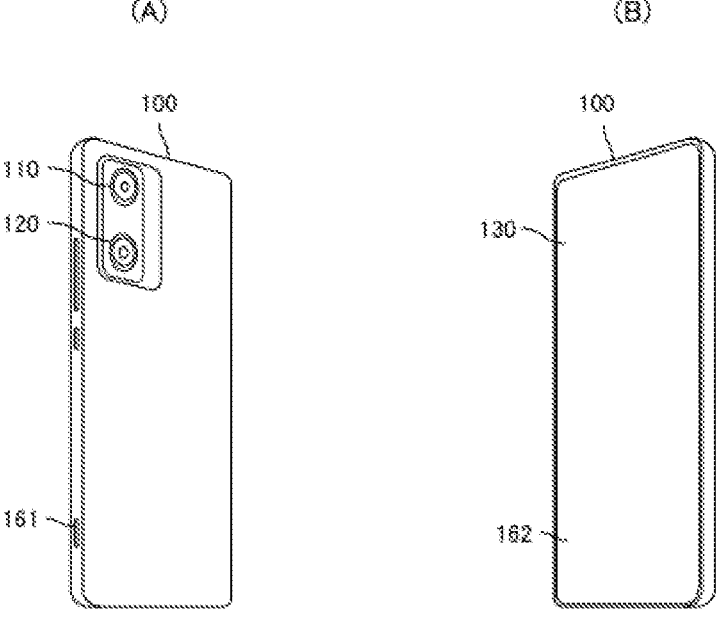
FIG. 1 is a schematic view of an appearance of a photographing device according to embodiments of the present disclosure.

The present disclosure will be explained through embodiments of the present disclosure, but the inventions defined in claims are not limited to the following embodiments. In addition, not all the structures described in the embodiments are necessary means to solve technical problems. Moreover, when there are a plurality of identical structures or a plurality of structures with identical compositions in the drawings, in order to avoid complicating the structures, only some parts are marked with reference numerals, and identical reference numerals for other parts are omitted.

Problems to be Solved

Since phase pixels that exclusively output phase difference signals do not output image signals for image generation, in the case of image generation, pixel values in addresses where phase pixels are configured are generated by interpolation processing according to pixel values of surrounding pixels. Consequently, if the proportion of phase pixels among the pixels forming the photographing element is increased, the quality of the generated image will be degraded. Especially when a plurality of phase pixels are adjacent and arranged continuously, they may appear as visible noise in the generated image. Therefore, the phase pixels are preferably configured discretely in a manner of being surrounded by ordinary pixels, and the proportion of the phase pixels is also preferably small. However, when the phase pixels are arranged as described above, it is difficult to detect phase difference signals that reflect the subject relatively small with respect to the whole image captured by the first photographing element, and it may be unable to focus on the subject. For example, in a scene where there is a slender main subject in front of a background with many high-frequency components, it is easy to cause a failure of focusing on the background instead of focusing on the main subject.

The present disclosure is intended to solve the problems and provides a photographing device and a focus control method, which can accurately and automatically focus on a main subject even in a case of generating a wide-angle image that reflects the main subject relatively small. Moreover, the present disclosure also provides a method for photographing a wide-angle image.

FIG. 1 is a schematic view of an appearance of a photographing device 100 according to embodiments of the present disclosure. In particular, (A) in FIG. 1 mainly shows a first surface of the photographing device 100, and (B) in FIG. 1 mainly shows a second surface opposite to the first surface. The photographing device 100 according to embodiments of the present disclosure is a so-called smart phone, i.e., a smart phone that also functions as a photographing device. Hereinafter, the photographing function related to the present disclosure among functions of the smart phone will be described, and other functions using image data generated by photographing will be omitted. In addition, although the photographing device 100 is described in the embodiments of the present disclosure using the smart phone as an example, it may also be a photographing device as a single camera or a device with the photographing function for example mounted in a tablet computer terminal.

The photographing device 100 includes a first camera unit 110 and a second camera unit 120 configured in a same direction on the first surface. The first camera unit 110 is a camera unit for generating a wide-angle image. The second camera unit 120 is a camera unit for generating a telephoto image. A user utilizes the first camera unit to shoot when the user wants to get a wide-angle image, and utilizes the second camera unit to shoot when the user wants to get a telephoto image. The first camera unit 110 and the second camera unit 120 are configured parallel to a long side of the photographing device 100 in the drawings, but the arrangement of the two camera units is not limited thereto, and for example, the two camera units may be configured along a straight line obliquely intersecting with the long side. In addition, the configuration of the first camera unit 110 and the second camera unit 120 may be opposite to the configuration shown in the drawings.

The photographing device 100 includes a display 130 on the second surface. For example, the display 130 is a display device using an organic EL (electro luminescence) panel, which displays a real-time image (live view display) of a subject before shooting or displays an image after shooting. In addition, a camera unit for taking selfies, independent from the first camera unit 110 and the second camera unit 120, may be provided on the second surface.

A shutter button 161 is at a side of the photographing device 100. The user can provide a photographing instruction for the photographing device 100 by pressing the shutter button 161. In addition, a touch panel 162 is provided and overlaps with the display 130. Instead of pressing the shutter button 161, the user can also provide the photographing instruction for the photographing device 100 by tapping a shutter key displayed on the display 130. Moreover, the user can also tap any part of a subject image displayed in a live view to specify a certain area containing this part as a focus area. Furthermore, the user can switch between the first camera unit 110 and the second camera unit 120 or select items in a displayed menu by tapping and other contact actions.

Figure 2:
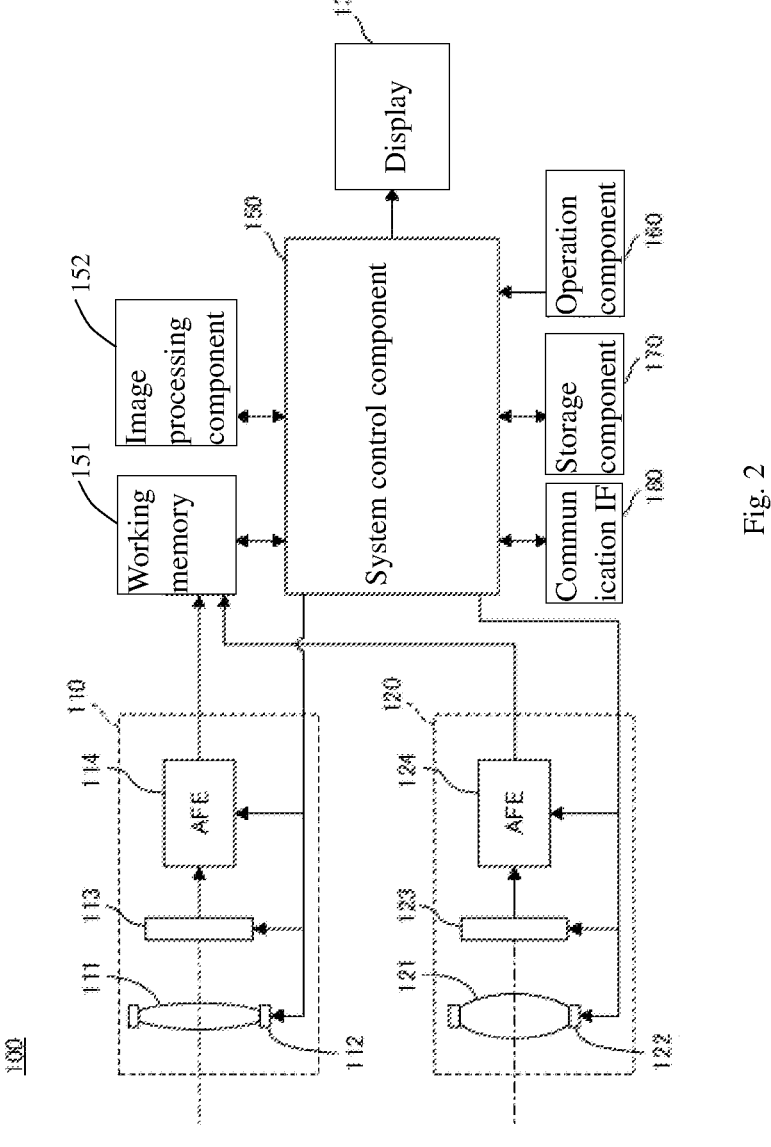
FIG. 2 is a schematic view of a main hardware configuration of the photographing device according to embodiments of the present disclosure.

FIG. 2 is a schematic view of a main hardware configuration of the photographing device 100 according to embodiments of the present disclosure. In addition to the first camera unit 110, the second camera unit 120, and the display 130, the photographing device 100 also includes a system control component 150 controlling the first camera unit, the second camera unit and the display, and peripheral elements that cooperate with the system control component 150.

As described above, the first camera unit 110 is a camera unit for generating wide-angle images, and mainly includes a first optical system 111, a first driving mechanism 112, a first photographing element 113, and a first analog front end (AFE) 114. The first optical system 111 is an optical system for imaging an incident subject beam on a photographing plane of the first photographing element 113. Represented by one lens in the drawings, but generally composed of a plurality of lenses, the first optical system is a focusing lens of which at least a part can advance and retreat along an optical axis direction. The first driving mechanism 112 is a driving mechanism configured to move the focusing lens of the first optical system 111 in the optical axis direction, and includes an actuator that operates according to instructions of the system control component 150.

The first photographing element 113 is, for example, a CMOS image sensor. The first photographing element 113 will be described in detail later. The first photographing element 113 transmits a pixel signal (an image signal and a phase difference signal described later) as an output signal to the first analog front end 114 according to the instructions of the system control component 150. The first analog front end 114 adjusts a level of the pixel signal according to a gain indicated by the system control component 150, converts its A/D into digital data, and transmits it to a working memory 151.

As described above, the second camera unit 120 is a camera unit for generating telephoto images, and mainly includes a second optical system 121, a second driving mechanism 122, a second photographing element 123 and a second analog front end (AFE) 124. The second optical system 121 is an optical system for imaging an incident subject beam on a photographing plane of the second photographing element 123. Represented by one lens in the drawings, but generally composed of a plurality of lenses as the first optical system 111, the second optical system 121 is a focusing lens of which at least a part can advance and retreat along an optical axis direction. The second driving mechanism 122 is a driving mechanism configured to move the focusing lens of the second optical system 121 in the optical axis direction, and includes an actuator that operates according to instructions of the system control component 150.

The second photographing element 123 is, for example, a CMOS image sensor. The second photographing element 123 and the first photographing element 113 will be described in detail later. The second photographing element 123 transmits a pixel signal as an output signal to the second analog front end 124 according to the instructions of the system control component 150. The second analog front end 124 adjusts a level of the pixel signal according to a gain indicated by the system control component 150, converts its A/D into digital data, and transmits it to the working memory 151.

In embodiments of the present disclosure, each of the first optical system 111 and the second optical system 121 is a single-focus optical system with a fixed focal length, or at least one of them is a variable-focus optical system (zoom lens) that can change the focal length. Even in the case of adopting a variable focus optical system, the focal length of the first optical system 111 may be set to be shorter than that of the second optical system 121. In other words, a viewing angle of the second optical system 121 is set to be a telephoto viewing angle compared with a viewing angle of the first optical system 111.

The system control component 150 is a processor (CPU: central Processing Component) that directly or indirectly controls each element constituting the photographing device 100. The system control component 150 functions as various function control components according to the control program to be executed. For example, it functions as a focus control component when the focus control over the first camera unit 110 and the second camera unit 120 is executed, and functions as a display control component when a captured image is to be displayed on the display 130.

The photographing device 100 mainly includes the working memory 151, an image processing component 152, an operation component 160, a storage component 170, and a communication interface 180, as the peripheral elements that cooperate with the system control component 150. The working memory 151 is a volatile high-speed storage that is for example composed of SRAM (Static Random Access Storage). The working memory 151 receives pixel data sequentially converted from the first analog front end 114 and the second analog front end 124, separately. If the pixel data is data converted from the image signal, it is collectively stored in frame data of one frame; and if the data is converted from the phase difference signal, it is collectively stored as two waveform data. The working memory 151 transfers the frame data to the image processing component 153 and the waveform data to the system control component 150. In addition, the working memory 151 is also used as a temporary storage area when the image processing component 153 performs image processing or the system control component 150 performs focusing processing.

The image processing component 153 is for example composed of an ASIC (Application Specific Integrated Circuit) and performs various image processing such as interpolation processing on the received frame data to generate image data conforming to a predetermined format. If the generated image data is used for storage, it is stored in the storage component 170, and if the generated image data is used for display, it is displayed on the display 130.

The operation component 160 is an input device including the shutter button 161 or a touch panel 162 and is a member that operates when the user provides an instruction for the photographing device 100. In a case that the photographing device 100 accepts voice input, the operation component 160 may further include a microphone. The storage component 170 is a nonvolatile memory and is for example composed of SSD (Solid State Drive). The storage component 170 not only stores image data generated by shooting, but also stores constants, variables, set values, control programs and the like that are required when the photographing device 100 performs operations. The communication interface 180 may include a communication unit for 5G lines or wireless LAN. The communication interface 180 is used to transmit the generated image data to an external device.

Figure 3:
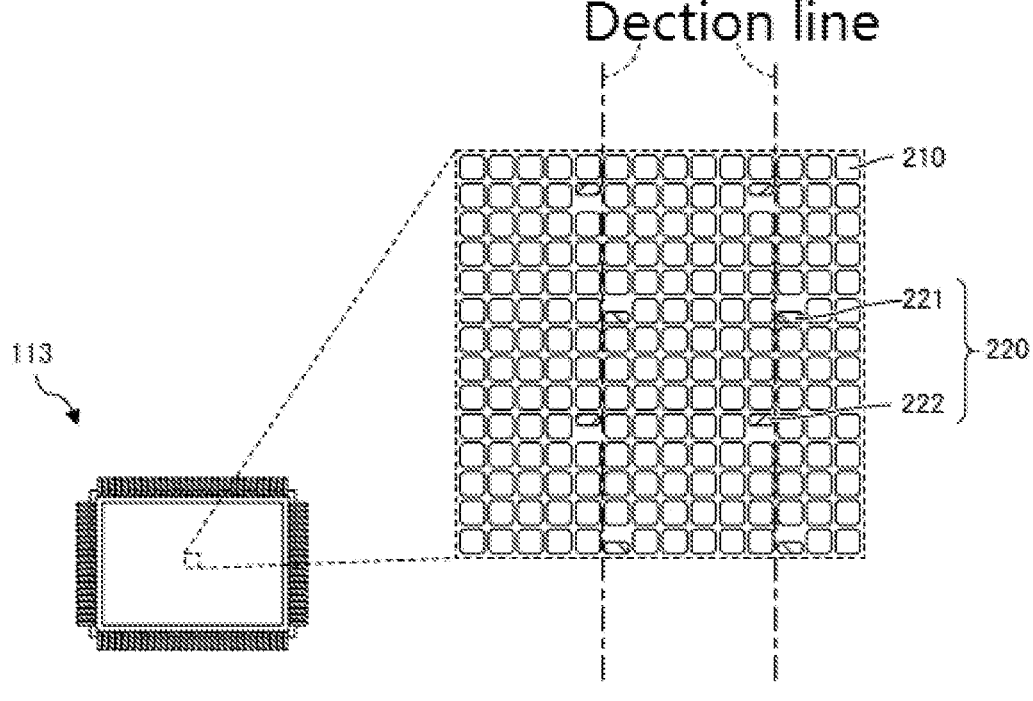
FIG. 3 is a schematic view of a pixel arrangement of a photographing element according to embodiments of the present disclosure.

FIG. 3 is a schematic view of a pixel arrangement of the first photographing element 113 according to embodiments of the present disclosure. In embodiments of the present disclosure, since the second photographing element 114 is the same as the first photographing element 113, the first photographing element 113 will be described here.

The first photographing element 113 is a photographing element including a two-dimensional arrangement of ordinary pixels 210 that output an image signal dedicated to generating an image and phase pixels 220 that output a phase difference signal dedicated to detecting a focus. Each ordinary pixel 210 is a pixel in which a photoelectric conversion component in a substantially square shape is configured without displacement relative to a micro-lens. In the ordinary pixel 210, a color filter of any one of RGB is configured between the micro-lens and the photoelectric conversion component.

Each phase pixel 220 is a pixel in which, for a micro-lens, a substantially rectangular photoelectric conversion component is configured with displacement relative to an optical axis of the micro-lens, the photoelectric conversion component being similar in shape to one of two portions, into which the photoelectric conversion component of an ordinary pixel is divided. In the phase pixel 220, no color filter is arranged between the micro-lens and the photoelectric conversion component. Among the phase pixels 220, all the adjacent pixels are ordinary pixels 210, in other words, each phase pixel 220 is surrounded by the ordinary pixels 210 and arranged discretely. In addition, in the configuration of the phase pixel 220, the configuration of the photoelectric conversion component may be the same as that of the ordinary pixel 210, and a light shielding mask with a shift opening is arranged between the micro-lens and the photoelectric conversion component, which produces the same effect as when the photoelectric conversion component is shifted as described above.

There are two types of phase pixels 220, namely a first phase pixel 221 whose photoelectric conversion component is shifted in the first direction (the lower side in the drawings) and a second phase pixel 222 whose photoelectric conversion component is shifted in the direction opposite to the first direction (the upper side in the drawings). The first phase pixels 221 and the second phase pixels 222 are arranged in predetermined patterns, respectively. Specifically, a plurality of detection lines are set along the displacement direction (up and down direction in the drawings) of the displacement pixels. The first phase pixels 221 are periodically arranged on one side (right side in the drawings) of each detection line, and the second phase pixels 222 are arranged out of phase on the other side (left side in the drawings) with the same period.

A first phase waveform is generated according to the phase difference signal as the output signal of the first phase pixel 221, and a second phase waveform is generated according to the phase difference signal as the output signal of the second phase pixel 222. In addition, in the focus control, the system control component 150 calculates the out-of-focus amount as the relative offset between the first phase waveform and the second phase waveform, the out-of-focus direction as the offset direction, and the focus evaluation value acquired from the coincidence degree of the two waveforms, so as to acquire defocus information. Based on the acquired defocus information, the system control component 150 performs focusing processing to focus on a predetermined subject. The focusing process will be described in detail later.

In addition, even if each of the first photographing element 113 and the second photographing element 123 is the photographing element including the two-dimensional arrangement of ordinary pixels and phase pixels surrounded by the ordinary pixels and arranged discretely, they may also be different photographing elements. Each photographing element may be different from each other, for example, in the overall number of pixels or the arrangement pattern of phase pixels.

In addition, in the example of the figure, the detection line is set along one axial direction as the up-down direction. the detection line may also be set in the orthogonal direction (the left-right direction in the example of the figure), and the phase pixels (the phase pixels shifted to the right and the phase pixels shifted to the left in the example of the figure) may be arranged suitable for the detection line. In this case, each phase pixel is preferably surrounded by ordinary pixels. If the detection lines are set in two orthogonal axial directions in this way, the focusing accuracy can be improved.

In addition, because the phase pixels that exclusively output phase difference signals do not output image signals for generating images, in the case of generating images based on image signals output by ordinary pixels, the pixel values of pixels with the addresses of phase pixels are generally generated by interpolation processing according to the pixel values of surrounding pixels. Therefore, if the proportion of phase pixels among the pixels forming the photographing element is increased, the quality of the generated image will be degraded. Especially, when a plurality of phase pixels are adjacent and arranged continuously, they may appear as visible noise in the generated image. Therefore, like the first photographing element 113 and the second photographing element 123 in embodiments of the present disclosure, it is preferable that the phase pixels are arranged discretely and surrounded by ordinary pixels, and the proportion thereof is also preferably small. In the first photographing element 113 and the second photographing element 123 in embodiments of the present disclosure, the total number of phase pixels 220 is less than 5% of the total number of pixels.

However, when the phase pixels are discretely arranged in a small number as described above, the focus control component cannot acquire accurate defocus information that reflects the subject relatively small relative to the whole image captured by the photographing element, and as a result, it may not be able to focus on the subject. For example, in a scene where there is a slender main subject in front of a background with many high-frequency components, it is easy to cause a failure of focusing on the background instead of focusing on the main subject. This kind of fault is more likely to occur when the optical system with wide angle of view is used for reflection. Therefore, in the case of forming a wide-angle image using the image signal output from the first photographing element 113 of the first camera unit 110, the photographing device 100 in embodiments of the present disclosure refers to the second defocus information acquired from the phase difference signal output from the second photographing element 123 of the second camera unit 120, to perform the focus control over the first optical system 111. The following describes the focus control in sequence with specific scenes.

Figure 4:
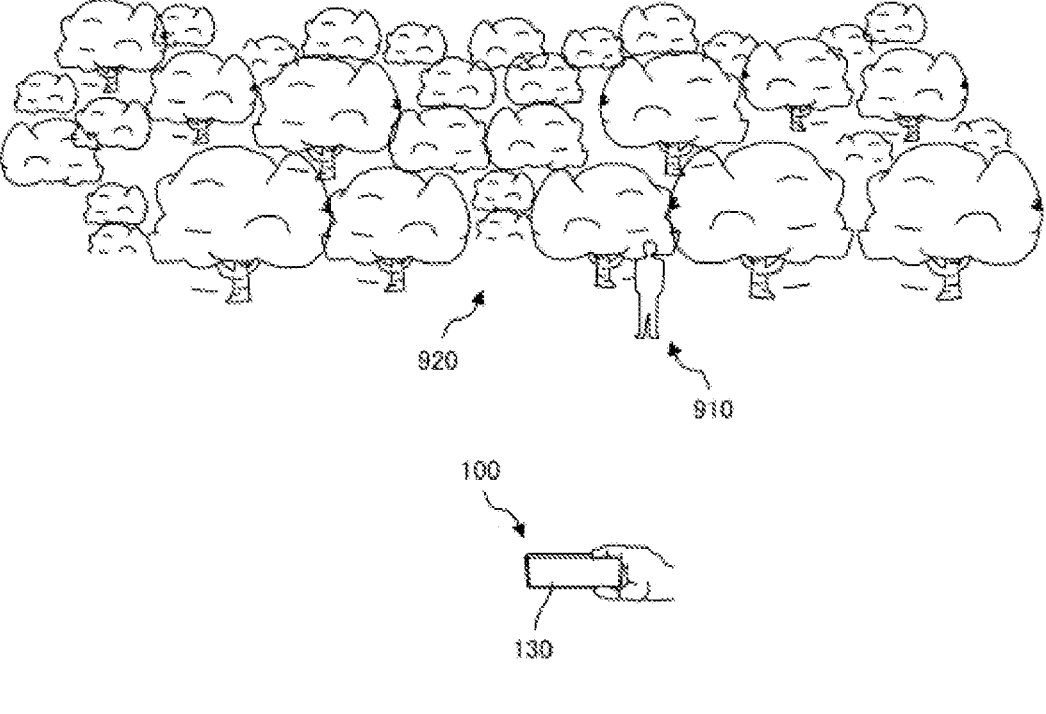
FIG. 4 is a schematic view of a scene as a subject to be photographed, according to embodiments of the present disclosure.

FIG. 4 a schematic view of a scene as a subject to be photographed. Specifically, it is shown that the user attempts to photograph a scene in which the forest 920 is spread behind the person 910 as the main subject through the photographing device 100, according to embodiments of the present disclosure. Here, it is assumed that the user wants to focus on the person 910. The user can determine the composition of picture while confirming the live view images continuously acquired through the first camera unit 110 or the second camera unit 120 and displayed on the display 130.

Figure 5:
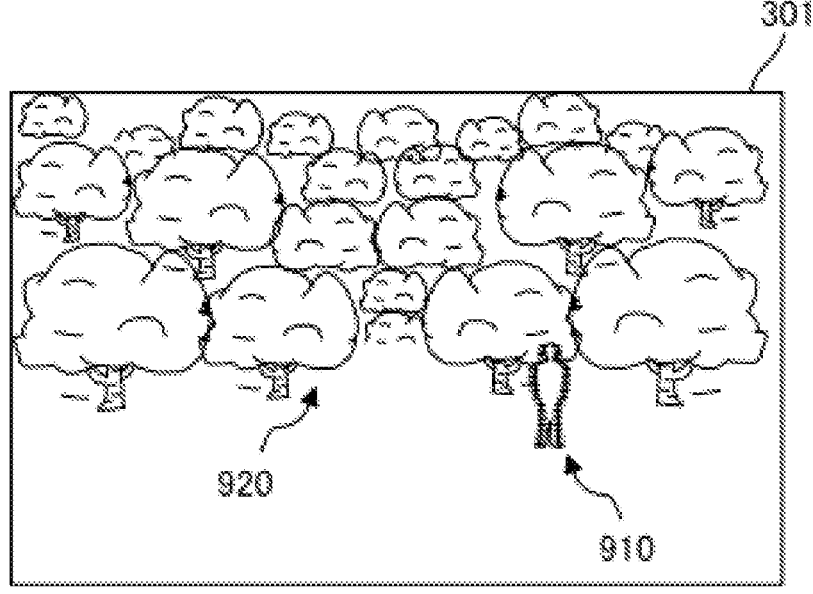
FIG. 5 is a schematic view of an image acquired from a first camera unit when autofocus control is performed by a phase difference signal from the first camera unit, according to embodiments of the present disclosure.

FIG. 5 is a schematic view of an image acquired from the first camera unit 110 when the autofocus control over the first optical system 111 is performed only by the phase difference signal from the first camera unit 110, according to embodiments of the present disclosure. The forest 920 as the background of the scene is a collection of many trees, so the image area (background area) of the forest 920 is an area with high spatial frequency within the perspective captured by the first camera unit 110. On the other hand, the image area (primary area) of the person 910 as the main subject only occupies a very small part of the viewing angle captured by the first camera unit 110, which is an area with relatively low spatial frequency.

When the detection line crosses the background area with high spatial frequency and the primary area with low spatial frequency, a so-called far-near conflict occurs, and the focus control component calculates defocus information for the background area with high spatial frequency. When the focusing lens of the first optical system 111 is driven based on the defocus information calculated in this way, the first optical system 111 focuses on the forest 920 as the background, and the wide-angle image 301 generated after this focusing shows that the person 910 as the main subject is a blurred image. Especially, when the phase pixels 220 arranged along the detection line are discrete, the number of the phase pixels 220 included in the small primary area becomes less, and it is more difficult for the focus control component to calculate defocus information based on the waveform generated by the phase difference signals output from the phase pixels 220 included in the primary area.

In the scene of FIG. 4, when autofocus control is performed only by the first defocus information acquired from the phase difference signal output from the first photographing element 113, it can be said that it is difficult for the user to focus on the person 910 that the user wants to focus on.

Figure 6:
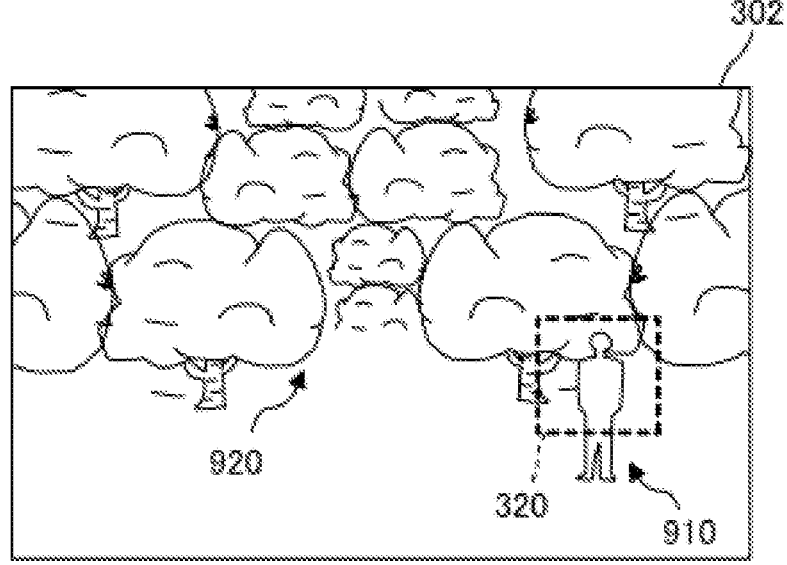
FIG. 6 is a schematic view of an image acquired from a second camera unit when autofocus control is performed on the same scene by a phase difference signal from the second camera unit, according to embodiments of the present disclosure.

FIG. 6 is a schematic view of an image acquired from the second camera unit 120 when the autofocus control over the second optical system 121 is performed on the same scene by the phase difference signal from the second camera unit 120, according to embodiments of the present disclosure. The second optical system 121 of the second camera unit 120 has a telephoto angle compared with the first optical system 111, so the proportion of the image area (primary area) of the person 910 in the whole area is larger than that in the case of FIG. 5. Then, the number of phase pixels 220 included in the primary area also increases, and the finer parts of the person 910 are distinguished, so the spatial frequency thereof becomes higher.

Even when the detection line crosses the primary area and the background area, if the proportion of the primary area is large and the waveform generated by the phase difference signal output by the phase pixels 220 in the primary area is dominant, it is not easy to cause far-near conflict. Therefore, the focus control component can calculate defocus information for the primary area. When the focusing lens of the second optical system 121 is driven based on the defocus information calculated in this way, the second optical system 121 focuses on the person 910 as the main subject, and as shown in the drawings, the telephoto image 302 generated after the focusing is an image in which the focus is focused on the person 910.

That is, in the scene of FIG. 4, if autofocus control is performed based on the second defocus information acquired from the phase difference signal output from the second photographing element 123, it can be said that the user is easy to focus on the person 910 that the user wants to focus on. Therefore, even if the user wants to select the first camera unit 110 to acquire a wide-angle image, the possibility that the first optical system 111 also focuses on the person 910 can be improved if the second defocus information acquired by referring to the phase difference signal output from the second photographing element 123.

In order to perform such focus control, even when the user selects the first camera unit 110, the focus control component drives the second photographing element 123 to make the phase pixel 220 output the phase difference signal to acquire the second defocus information. By referring to the second defocus information, the focus control component moves the focusing lens of the first optical system 111 and focuses on the person 910. The second defocus information specifically includes the area information of the second focus area 320, which is the area where the focus evaluation is performed in the second photographing element 123, and the out-of-focus amount, out-of-focus direction and focus evaluation value in the second focus area.

Figure 7:
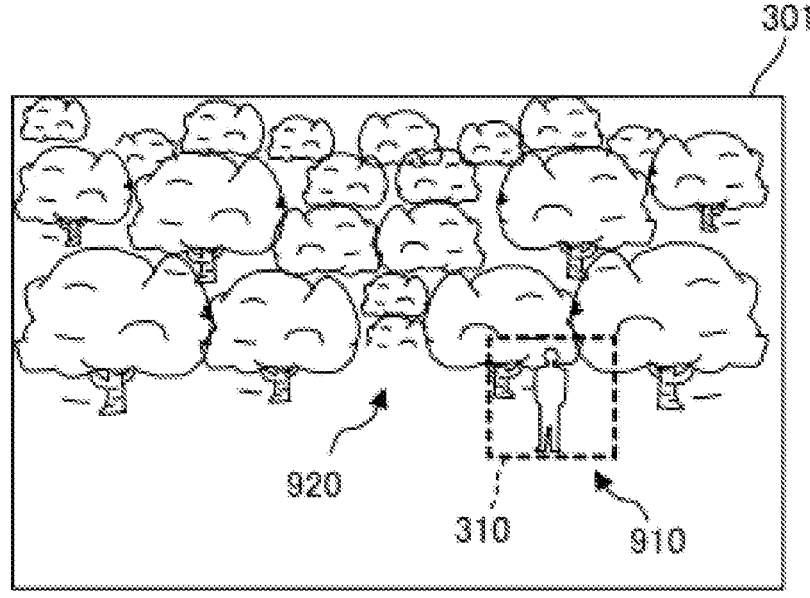
FIG. 7 is a schematic view of an image acquired from the first camera unit when autofocus control over a first optical system is performed with reference to second defocus information, according to embodiments of the present disclosure.

FIG. 7 is a schematic view of an image acquired from the first camera unit 110 when autofocus control over the first optical system 111 is performed with reference to the second defocus information, according to embodiments of the present disclosure. The focus control component determines the first focus area 310 as the focus area in the first camera unit 110 based on the area information of the second focus area 320 included in the second defocus information. The first camera unit 110 and the second camera unit 120 are arranged close to each other, and the optical axis of the first optical system 111 and the optical axis of the second optical system 121 are parallel to each other. Therefore, for the sake of simplicity, regardless of the depth of the subject, a conversion formula or a reference table that can correspond to each other one by one can be prepared in advance based on each viewing angle. The focus control component determines the first focus area 310 based on the area information of the second focus area 320 by using this conversion formula or reference table.

When the first focus area 310 is determined, the focus control component performs focus control over the first optical system 111 on the premise that there is a main subject in this area. Specifically, among the phase difference signals output by the first photographing element 113, a phase waveform is generated only for the phase difference signals included in the first focus area 310. Furthermore, the focus range (i.e., the depth range in which the main subject is supposed to exist) is defined by referring to the out-of-focus amount and the out-of-focus direction of the second defocus information, so that it is not affected by the background area. According to the conditions defined in this way, the out-of-focus amount and the out-of-focus direction as the first defocus information are determined. The focus control component determines the moving direction and amount of the focusing lens of the first optical system 111 based on the determined out-of-focus amount and out-of-focus direction, and by moving in this way, can focus on the person 910 as the main subject.

After the focusing lens moves, the focus control component causes the first photographing element 113 to output the phase difference signal again, evaluates its phase waveform, and determines whether it is in a focus state. When it is determined that it is in the focus state, shooting processing is executed to generate a wide-angle image 301. When it is determined that the focus state is not reached, the first defocus information can be acquired again to correct the position of the focusing lens. Alternatively, the position of the focusing lens may be corrected while the focusing lens is wobbling, so that the contrast of a partial image generated from an image signal output from an ordinary pixel included in the first focus area 310 is the highest. The latter is called contrast AF. In addition, more simply, after determining the first focus area 310 based on the second focus area 320, the focus control component may immediately perform contrast AF on the first focus area 310 without acquiring the first defocus information from the first photographing element 113.

In addition, when it is determined that it is difficult to perform the focus control over the first optical system 111 based on the first defocus information, the focus control component may also perform the focus control over the first optical system with reference to the second defocus information. That is, when it is determined that the focus control over the first optical system 111 is performed based on the first defocus information, the focus control over the first optical system may be performed without referring to the second defocus information. For example, it can be judged whether it is difficult to perform the focus control over the first optical system 111 based on the first defocus information by whether the focus evaluation value in the first defocus information is less than a threshold or more than a threshold. Alternatively, the second defocus information can be acquired in parallel with the acquisition of the first defocus information, and the judgment can be made by comparing each out-of-focus amount and out-of-focus direction. Specifically, if the depth of the object calculated from the out-of-focus amount and out-of-focus direction included in the first defocus information and the depth of the object calculated from the out-of-focus amount and out-of-focus direction included in the second defocus information are within a fixed range, it is assumed that the same object is captured, so it is determined that the focus control over the first optical system 111 can be performed based on the first defocus information. If it is not within the fixed range, it is assumed that different subjects are captured respectively and is determined that it is difficult to perform focus control over the first optical system 111 based on the first defocus information.

Figure 8:
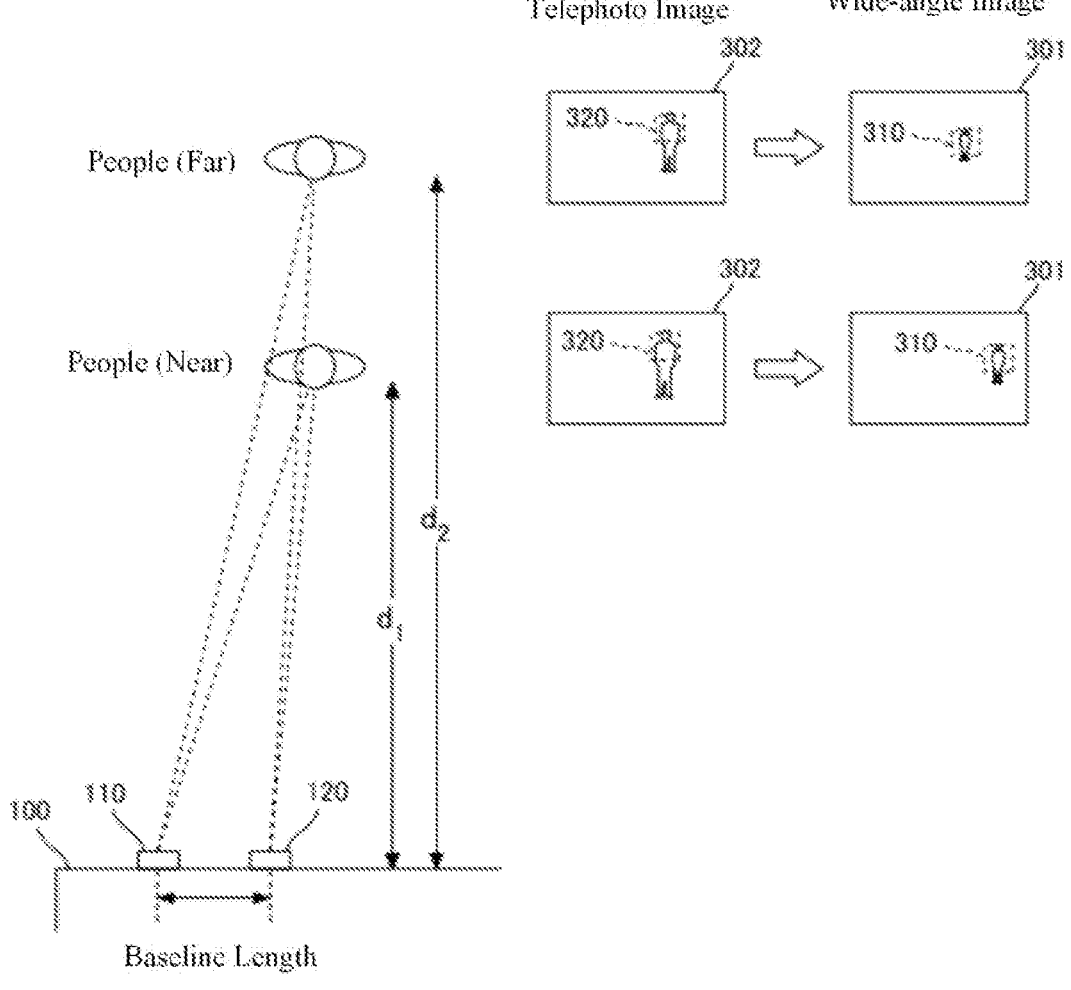
FIG. 8 illustrates a correspondence relationship between two focus areas, according to embodiments of the present disclosure.

In the above, in the case of determining the first focus area 310 according to the second focus area 320, an example of using a conversion formula and the like has been explained for simplicity. But actually, the first focus area 310 corresponding to the second focus area 320 may change according to the change of the depth (distance to the subject) of the subject. FIG. 8 is an explanatory diagram for explaining the correspondence between two focus areas, according to embodiments of the present disclosure. Specifically, the figure shows that the first camera unit 110 and the second camera unit 120 capture a person existing at a distance d1 from the photographing device 100 and a person existing at a distance d2 from the photographing device, respectively, and a telephoto image 302 and a wide-angle image 301 thus captured.

As shown in the drawings, it is assumed that a person existing at a near distance d1 and a person existing at a far distance d2 are both close to the second camera unit 120 side. In this case, if the telephoto image 302 generated from the second camera unit 120 is compared with the wide-angle image 301 generated from the first camera unit, the interval between the second focus area 320 and the first focus area 310 for capturing a person existing at a near distance d1 is larger than the interval between the second focus area 320 and the first focus area 310 for capturing a person existing at a far distance d2. In addition, when comparing with the same wide-angle image 301, the first focus area 310 is shifted to the right when a person exists at a distance d1 compared with when a person exists at a distance d2.

This correspondence can be calculated by triangulation. Specifically, when the distance between the second focus area 320 and the person as the main subject is calculated in the telephoto image 302, the first focus area 310 in the wide-angle image 301 can be determined using the baseline length as the distance between the optical axes of the two optical systems and the viewing angle ratio of the two optical systems. In addition, the distance to the person can be calculated according to the out-of-focus amount and direction in the second defocus information and the position of the focusing lens at that time.

If the focus control component determines the first focus area 310 corresponding to the second focus area 320 more accurately in this way, the accuracy of the focus control over the first optical system 111 can be further improved.

In addition, when the user does not specify the focus area, the focus control component can determine the main subject to be focused according to an algorithm such as general near-point priority (subject near the photographing device is given priority) or center priority (subject near the center of the viewing angle is given priority). In this case, it can be judged that it is difficult to perform the focus control over the first optical system 111 based on the first defocus information if the object calculated from the out-of-focus amount and out-of-focus direction included in the first defocus information exists at a position farther than the object calculated from the out-of-focus amount and out-of-focus direction included in the second defocus information.

In addition, when the user specifies a predetermined focus area, this predetermined focus area can be used as the first focus area 310. In addition, when a predetermined region is specified by a face region recognition program or the like, this predetermined region can be used as the first focus region 310. Even in this case, if it is determined that it is difficult to perform the focus control over the first optical system 111 based on the first defocus information, the focus control over the first optical system 111 can be performed by determining the second focus area 320 and referring to the second defocus information in this area.

Figure 9:
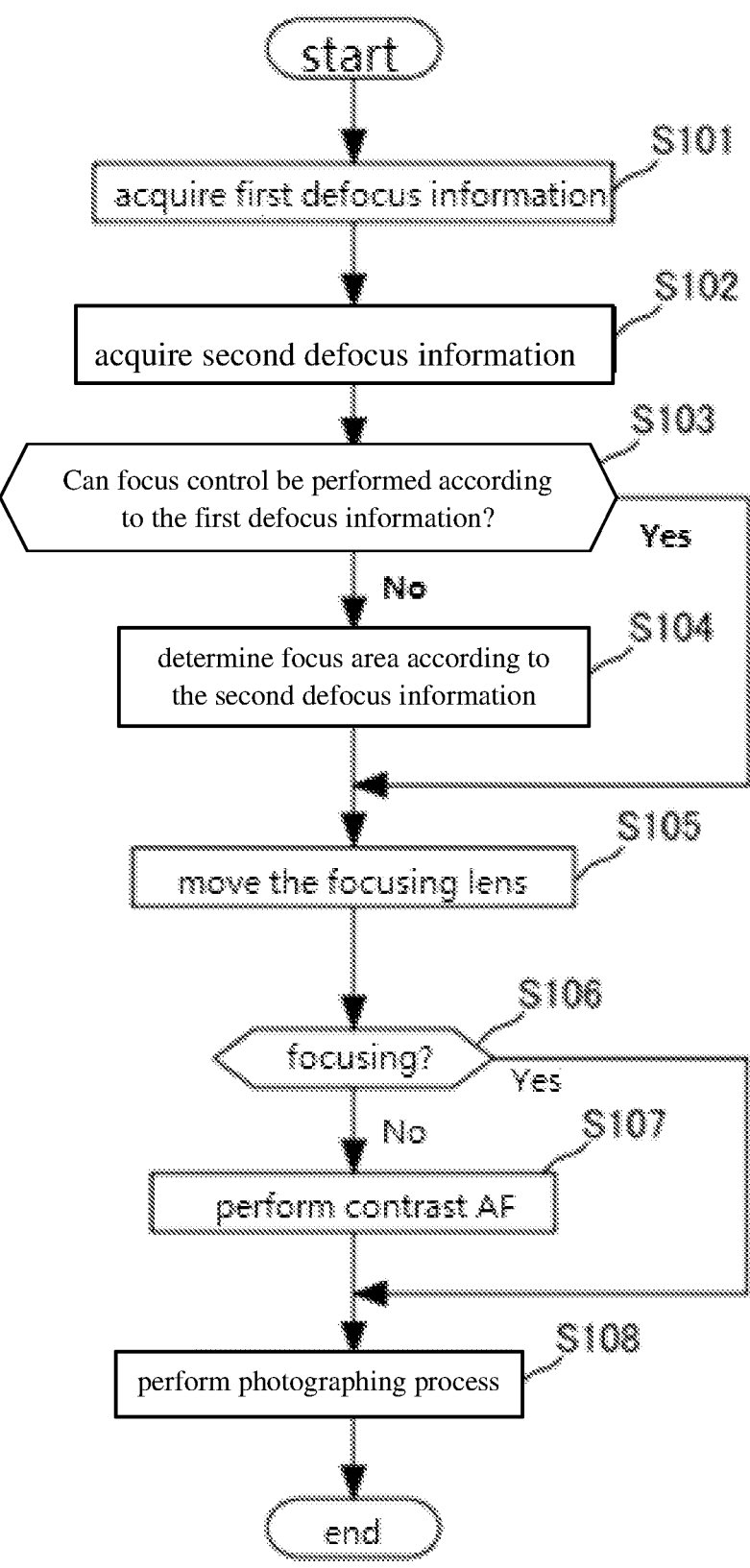
FIG. 9 illustrates a processing procedure until a wide-angle image is generated, according to embodiments of the present disclosure.

Next, an example of a series of processes in which the system control component 150 functions as a primary focus control component when the user selects the first camera unit 110 to shoot a wide-angle image will be described. FIG. 9 is a flow chart showing the primary processing procedure until the system control component 150 generates a wide-angle image, according to embodiments of the present disclosure. For example, the flow starts from a time point when the user presses the shutter button 161.

In step S101, the focus control component acquires the first defocus information. Specifically, as described above, the first photographing element 113 is driven to make the phase pixel 220 output the phase difference signal, and various operations are performed to acquire the first defocus information. In step S102, the focus control component acquires the second defocus information in the same way as the acquisition of the first defocus information. The processing of step S102 may be performed in parallel with step S101.

In step S103, the focus control component judges whether the focus control over the first optical system 111 can be performed based on the first defocus information. If yes, skip step S104 and proceed to step S105, and if no, proceed to step S104.

In a case of proceeding to step S104, the focus control component determines the first focus area 310 in the first photographing element 113 with reference to the second defocus information acquired in step S102 and proceeds to step S105.

When proceeding to step S105, in a case of skipping step S104, the focus control component moves the focusing lens of the first optical system 111 based on the first defocus information to focus on the main subject. In a case of passing step S104, in the determined first focus area 310, as described above, for example, the first defocus information is acquired again by imposing a restriction condition, and the focusing lens of the first optical system 111 is moved based on the first defocus information to focus on the main subject.

The focus control component proceeds to step S106, and causes the first photographing element 113 to output the phase difference signal again, evaluates its phase waveform, and determines whether it is in focus. When it is determined that it is in focus, step S107 is skipped and step S108 is entered. When it is determined that it is not in focus, step S107 is entered.

In a case of proceeding to step S107, as described above, the focus control component executes contrast AF to correct the position of the focusing lens so as to focus on the main subject. Then, step S108 is entered.

When proceeding to step S108, the system control component 150 drives the first photographing element 113 to make ordinary pixels output image signals and make the image processing component 153 generate image data. The system control component 150 stores the generated image data in the storage component 170 or displays it on the display 130 according to a preset instruction, or sends it to an external device through the communication interface 180, thereby completing a series of processing.

In the embodiments described above, it is assumed that a still image is captured by the first camera unit 110, but the same focus control can be performed even when a moving image is captured. For example, if frame images are continuously generated based on the image signal among the pixel signals output by the first photographing element 113, and the first defocus information is generated based on the phase difference signal, the same focus control as described above can be performed while referring to the second defocus information generated in parallel even when shooting a moving image.

In addition, in the embodiments described above, the case where the photographing device 100 is provided with two camera units has been described, but the same focus control can be performed even in a photographing device provided with three or more camera units. For example, if three camera units have optical systems with telephoto angle, standard angle and wide angle respectively, the focus control over camera units with wide angle can refer to defocus information acquired from camera units with standard angle and camera units with telephoto angle respectively. In addition, the focus control over the camera unit of the standard view angle can refer to the defocus information acquired from the camera unit of the telephoto view angle.

In addition, in the embodiments described above, an example of performing focus control based on one defocus information acquired by each focusing lens of the first optical system 111 and the second optical system 121 in an arbitrary state has been described, and a plurality of pieces of defocus information may also be acquired while changing the position of the focusing lens to perform focus control. For example, when an optical system with a small opening F value or an optical system with a long focal length is used, the position of the focusing lens can be changed several times according to its characteristics, and the defocus information of each time can be acquired. At this time, when the camera unit with telephoto angle adopts a liquid lens whose focal length can be changed according to the applied voltage, the moving range of the focusing lens can be determined based on the applied voltage. That is, since such a liquid lens can be a zoom lens with high magnification, for example, in a telephoto region, if the focusing lens is only allowed to move within this range on the premise of focusing on a subject other than 1.5 m, the acquisition time of defocus information can be shortened.

In another embodiment, the liquid lens can be a wide-angle lens or a telephoto lens. Because the liquid lens needs to change the thickness of the liquid unit through the motor during focusing, the required stroke during focusing is long or the moving speed of the motor is slow, which may affect the focusing speed. At this time, the optical system including the liquid lens can be assisted in focus control based on the defocus information of other optical systems. For example, a plurality of focusing distance intervals are determined, so that the liquid lens only needs to focus in a small range, thereby improving the focusing speed.

What is claimed is:

1. A photographing device, comprising:
a first camera unit having a first optical system;
a second camera unit facing a same direction as the first camera unit; and
a focus control component performing focus control over the first camera unit and the second camera unit, wherein:
each of the first camera unit and the second camera unit comprises a photographing element, and the photographing element comprises a two-dimensional arrangement of ordinary pixels that output an image signal for generating an image and phase pixels that are surrounded by the ordinary pixels and arranged discretely and output a phase difference signal for detecting a focus;
the focus control component performs focus control over the first optical system with reference to second defocus information acquired from the phase difference signal output by the photographing element of the second camera unit, in case that the image is generated using the image signal output by the photographing element of the first camera unit, and the second defocus information comprises area information of a second focus area where focus evaluation is performed in the photographing element of the second camera unit, and an out-of-focus amount, an out-of-focus direction and a focus evaluation value in the second focus area;
the focus control component acquires first defocus information and the second defocus information in parallel, wherein the first defocus information is acquired from the phase difference signal output by the photographing element of the first camera unit; and
the focus control component determines whether it is difficult to perform the focus control over the first optical system by comparing the first defocus information with the second defocus information.

2. The photographing device according to claim 1, wherein:
the focus control component determines a focus area during the focus control over the first optical system based on a baseline length determined by a configuration of the first camera unit and the second camera unit.

3. The photographing device according to claim 1, wherein:
the focus control over the first optical system is performed based on the second defocus information, in case that the focus control component determines that the second defocus information is needed to assist the focus control over the first optical system.

4. The photographing device according to claim 1, wherein:
the focus control component corrects a position of a focusing lens of the first optical system based on contrast information calculated using the image signal output by the photographing element of the first camera unit, after the focus control component drives the focusing lens of the first optical system with reference to the second defocus information.

5. The photographing device according to claim 1, wherein
the first optical system comprises a liquid lens that focuses according to an electrical signal, and
the focus control component controls the first optical system to focus based on the electrical signal determined by at least one of first defocus information or the second defocus information.

6. The photographing device according to claim 1, wherein the second camera unit comprises a second optical system, and each of the first optical system and the second optical system is a single-focus optical system with a fixed focal length.

7. The photographing device according to claim 1, wherein the second camera unit comprises a second optical system, and at least one of the first optical system or the second optical system is a variable-focus optical system.

8. A focus control method, comprising:
performing focus control over a first camera unit and a second camera unit of a photographing device, wherein the photographing device comprises: the first camera unit having a first optical system; and the second camera unit facing a same direction as the first camera unit,
wherein each of the first camera unit and the second camera unit comprises a photographing element, and the photographing element comprises a two-dimensional arrangement of ordinary pixels that output an image signal for generating an image and phase pixels that are surrounded by the ordinary pixels and arranged discretely and output a phase difference signal for detecting a focus; and wherein in case that the image is generated using the image signal output by the photographing element of the first camera unit, the method further comprises:

acquiring second defocus information based on the phase difference signal output by the photographing element of the second camera unit, and driving a focusing lens of the first optical system with reference to the second defocus information, wherein the second defocus information comprises area information of a second focus area where focus evaluation is performed in the photographing element of the second camera unit, and an out-of-focus amount, an out-of-focus direction and a focus evaluation value in the second focus area, and the method further comprising:

acquiring first defocus information and the second defocus information in parallel, wherein the first defocus information is acquired from the phase difference signal output by the photographing element of the first camera unit; and determining whether it is difficult to perform the focus control over the first optical system by comparing the first defocus information with the second defocus information.

9. A method for generating a wide-angle image, comprising:

acquiring first defocus information by a focus control component, wherein the first defocus information is acquired from a phase difference signal output by a photographing element of a first camera unit;

acquiring second defocus information by the focus control component, wherein the second defocus information comprises area information of a second focus area where focus evaluation is performed in a photographing element of a second camera unit, and an out-of-focus amount, an out-of-focus direction and a focus evaluation value in the second focus area;

judging, by the focus control component, whether to perform focus control over an optical system of the photographing element of the first camera unit based on the first defocus information;

determining, by the focus control component, a focus area of the photographing element of the first camera unit based on the second defocus information;

moving, by the focus control component, a focusing lens of the optical system of the photographing element of the first camera unit based on the first defocus information;

judging, by the focus control component, whether the photographing element of the first camera unit is in a focus state by making the photographing element of the first camera unit output a phase difference signal and evaluating a phase waveform of the phase difference signal;

correcting, by the focus control component, a position of the focusing lens to focus on a subject to be photographed; and executing a photographing process, wherein the method further comprising:

acquiring the first defocus information and the second defocus information in parallel; and determining whether it is difficult to perform the focus control over the optical system of the photographing element of the first camera unit by comparing the first defocus information with the second defocus information.

*     *     *     *     *